United States Patent
Gallienne

[11] Patent Number: 5,832,780
[45] Date of Patent: Nov. 10, 1998

[54] COMPACT REDUCTION GEAR WITH TWO REDUCTION STAGES

[75] Inventor: Didier Gallienne, Landigou, France

[73] Assignee: Bertrand Faure Equipements S.A., Boulogne Cedex, France

[21] Appl. No.: 749,172

[22] Filed: Nov. 14, 1996

[30] Foreign Application Priority Data

Nov. 17, 1995 [FR] France .................................. 95 13824

[51] Int. Cl.⁶ ........................................................ F16H 1/16
[52] U.S. Cl. .......................... 74/425; 74/89.14; 74/432; 74/446; 74/458
[58] Field of Search .................................. 74/425, 89.14, 74/446, 432, 458

[56] References Cited

U.S. PATENT DOCUMENTS 2,812,668  11/1957  Holt .
3,535,948  10/1970  Winzeler et al. .

FOREIGN PATENT DOCUMENTS 0 622 564  11/1994  European Pat. Off. .
713060    10/1941  Germany .................................. 74/425
3611-568  10/1987  Germany .................................. 74/425

*Primary Examiner*—Rodney H. Bonck
*Assistant Examiner*—Ankur Parekh
*Attorney, Agent, or Firm*—Pollack, Vande Sande & Priddy

[57] ABSTRACT

A reduction gear with two reduction stages including a first reduction stage consisting of a wheel and worm screw system. The system has a screw and a first wheel. A second stage includes a pinion meshing with a second toothed wheel. The wheel of the wheel and worm screw system includes two lateral parts spaced axially and equipped with teeth adapted to mate with the thread of the screw. A center part is located between the lateral parts, and includes teeth with an outside diameter less than the diameter of the teeth of the first wheel, this center part forming the pinion of the second reduction stage.

9 Claims, 2 Drawing Sheets

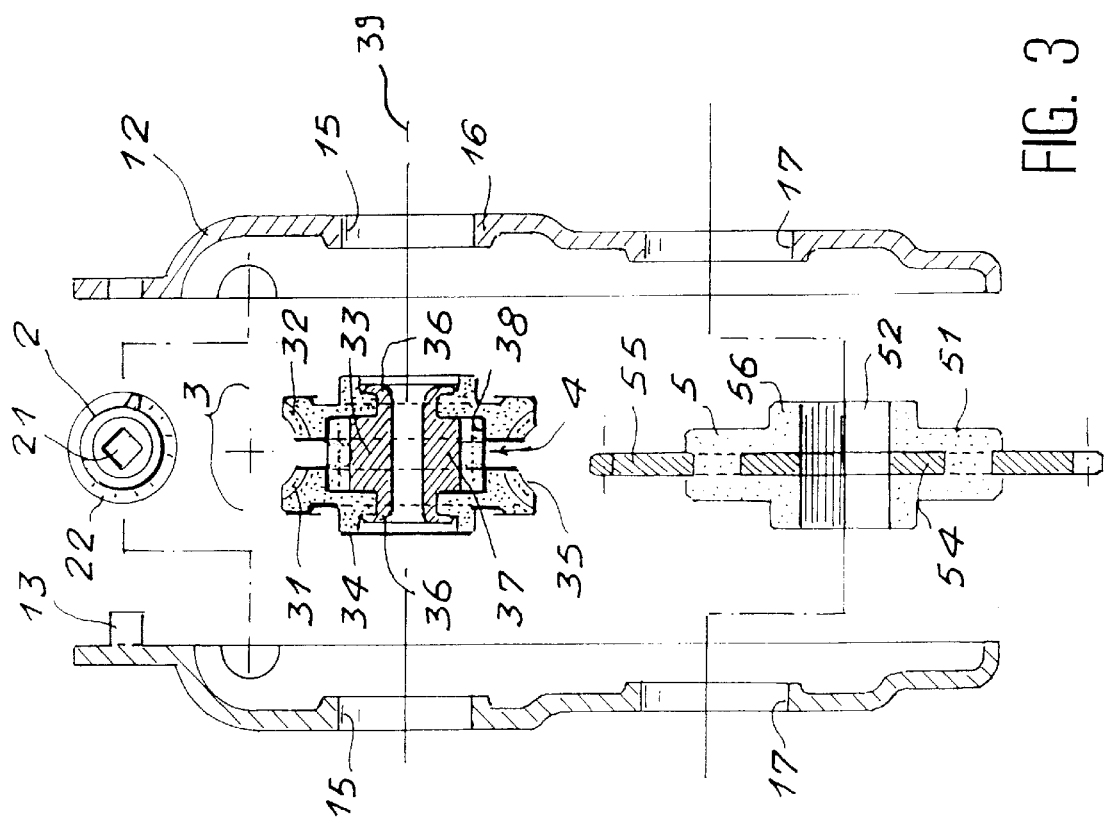
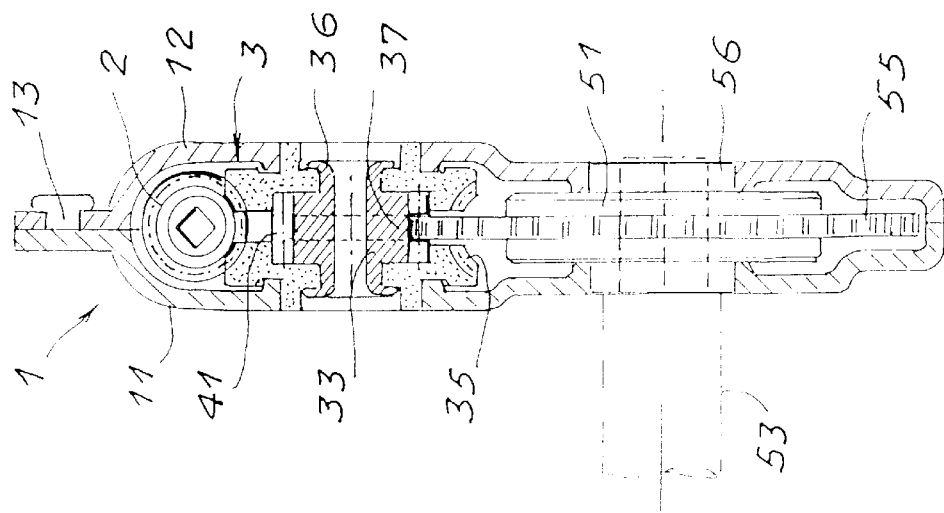

COMPACT REDUCTION GEAR WITH TWO REDUCTION STAGES

FIELD OF THE INVENTION

This invention concerns a reduction gear with two reduction stages allowing a high reduction ratio to be obtained between its input and output.

BACKGROUND OF THE INVENTION

The use of wheel and worm screw systems is known for obtaining high reduction ratios. The reduction ratio is directly dependent on the number of wheel teeth, but increasing the number of teeth increases the diameter of the wheel and therefore the overall size of the reduction gear.

BRIEF DESCRIPTION OF THE INVENTION

A solution is to add a second reduction stage, for instance a pinion-toothed wheel pair, where the pinion is attached in rotation to the wheel of the wheel and worm screw system.

However, even when the pinion is directly attached to the wheel, the result is an increase in the lateral dimensions of the reduction gear assembly.

The invention aims therefore in providing a reduction gear allowing a high reduction ratio while minimizing the overall dimensions.

With these targets in mind, the subject of the invention is a reduction gear with two reduction stages including a first reduction stage consisting of a wheel and worm screw system. The system has a screw and a first wheel. A second stage inclueds a pinion meshing with a second toothed wheel. The wheel of the wheel and worm screw system includes two lateral parts spaced axially and equipped with teeth adapted to mate with the thread of the screw. A center part is located between the lateral parts, and includes teeth with an outside diameter lower than the root circle of the teeth of the first wheel, this center part forming the pinion of the second reduction stage.

The invention avoids increasing the lateral dimensions of the reduction gear over and above the dimensions required by the wheel and worm screw system.

In addition, as the pinion and wheel forming the second reduction stage are located in the mid plane of the wheel and worm screw system, the reduction gear is symmetrical in relation to this plane, which simplifies its adaptation with the mechanisms that it is intended to drive.

Moreover, as the driving torque is transmitted by the screw to the two parts of the first wheel, and the resisting torque of the pinion is applied between these two parts, the loads on the bearings supporting the assembly formed by the first wheel and the pinion are distributed more or less evenly on both sides.

Other characteristics and advantages will appear in the description which will be given as an example of a reduction gear in compliance with the invention.

Refer to the appended drawings on which:

BRIEF DESCRIPTION OF THE FIGURES

FIG. 2 shows a sectional view through line II—II of FIG. 1,

FIG. 3 is an exploded view showing the various components of the reduction gear.

DETAILED DESCRIPTION OF THE INVENTION

Figure 1:
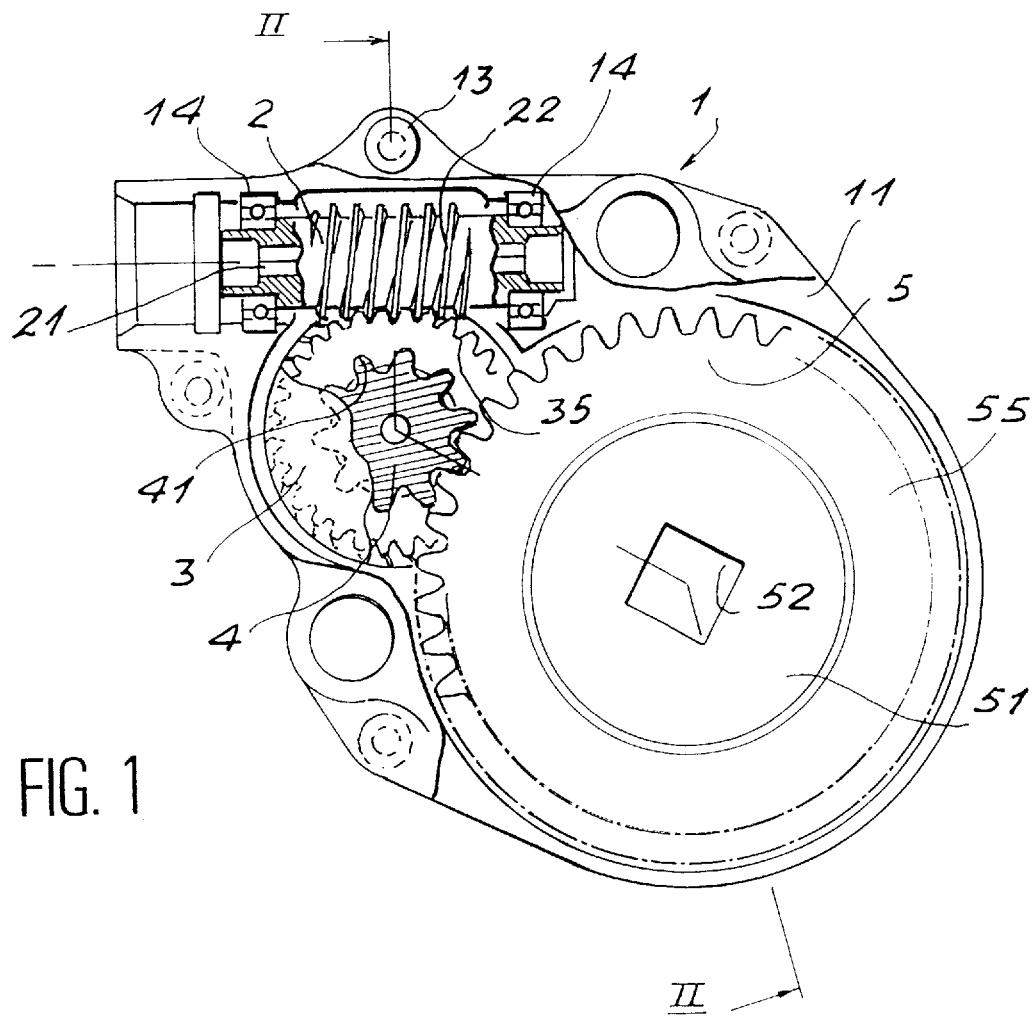
FIG. 1 shows a plan view of the reduction gear, casing open.
Figure 4:
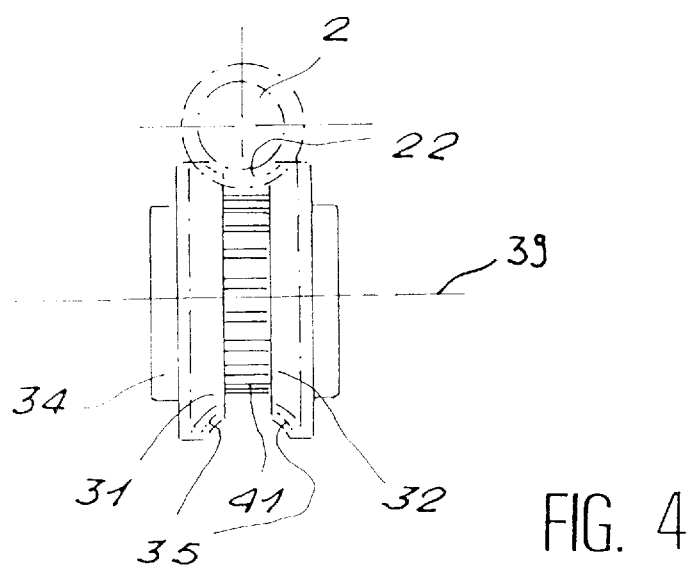
FIG. 4 shows a front view of the part acting as the wheel of the wheel and worm screw system and also the pinion of the second reduction stage.

The reduction gear includes a casing 1 consisting of two symmetrical parts 11, 12, assembled by crimped rivets 13. Inside this casing are housed the two reduction stages consisting of a worm screw 2 and a helical gear wheel 3 for the first stage, and a pinion 4 and a second toothed wheel 5 for the second stage respectively.

The worm screw 2 is positioned in the casing with its axis located in the junction plane of the parts 11, 12 of the casing. The ends of the screw 2 are installed in the bearings 14 which also act as an axial stop for the screw. A bore is made in the casing in alignment with the screw 2, to allow for the installation of a shaft of a drive motor, not shown. This shaft can be inserted in a bore 21, for example with a square section, made in the axis of the screw 2.

The wheel 3 is formed of 2 half-wheels 31, 32, made, for example, from a plastic material, installed in alignment with and respectively on the two lateral faces of a core 33, for example made of metal, and spaced apart from each other. The wheel has an axis 39. The two half-wheels 31, 32 are identical and include on their outer faces annular sections 34 which extend axially towards the outside and are guided in rotation in bores 15 made in each part of the housing respectively, these bores serving directly as bearings for the half-wheels 31, 32. These bores are made in the bosses 16 of the casing and ensure the axial positioning of the wheel 3. The two half-wheels, 31, 32 include, on their peripheries, helical teeth 35 made so that, when the two half-wheels are positioned on the core 33, their teeth form together a helical gear adapted to mate with the worm screw in the conventional manner for a wheel and worm screw reduction gear.

The two half-wheels are securely attached to the core 33, axially and in rotation, by a swaging achieved, for example, by folding the tubular axial ends 36 of the said core onto the outer face of the half-wheels, inside the annular sections 34.

In the free space between the two half-wheels and the core, there are exposed teeth 41 comprising the pinion 4 of the second reduction gear stage. The outside diameter of these teeth 41 is lower than the root circle of the teeth of the two half-wheels 31, 32, in order not to interfere with the thread 22 of the screw 2 When said screw meshes with the teeth 35 of the half-wheels.

Preferably, the center part 37 of the core 33 on which these teeth 41 are made extends axially over a distance greater than the spacing between the two half-wheels, the teeth extending over the complete width of the center part and the ends of this center part are inserted in the recesses 38 equipped with corresponding internal teeth made in each half-wheel 31, 32. When the half-wheels are made of a plastic material, these recesses and their internal teeth can he easily obtained by moulding. These internal teeth ensure both the relative positioning of the teeth of the two half-wheels and especially ensure rotational connection between the half-wheels and the core and therefore the transmission of the torque between the output wheel 3 of the wheel and worm screw stage and the input pinion 4 of the second reduction stage.

The wheel 5 of this second stage includes a hub 51, preferably made of a plastic material, on which is securely installed a metallic ring 55, with external teeth, which engages with the teeth made on the core 33, by passing between the two half-wheels 31, 32, the thickness of this ring being made for this purpose slightly less than the spacing between the half-wheels.

The hub includes a center bore 32 of square section, or including splines or something similar, provided to accommodate a reduction gear output shaft 53, of a corresponding section. To reinforce the hub and ensure transmission of the output torque to the shaft 53, torque which is fairly high on account of the high reduction ratio obtained by the two stages of the reduction gear, a metallic reinforcing plate 54 is embedded in the hub. The plate includes a bore of same section as the hub, which prevents damage to the square or the splines at the plastic hub. The manufacture of the wheel 5 will be advantageously achieved by overmoulding of the plastic hub 51 on the toothed ring 55 and on the reinforcing plate 54.

To ensure the positioning of the hub on the casing, the axial ends 56 of the hub are installed so that they can rotate freely in the bores 17 acting as the bearings made in the two parts of the casing 1, in a similar manner to the installation of the wheel 3.

Note that the use of a plastic material for the hub 51 and for the half-wheels 31, 32, allows the design of the reduction gear to be simplified as far as possible, profiting from the good friction coefficient between the plastic material used, for example a polyamide, and the material of the casing (for example Zamak), avoiding the use of additional bushes or bearings for the wheels 3 and 5.

The invention is especially applicable to motorized mechanisms for adjusting the seats of automobile vehicles.

I claim:

1. Reduction gear with two reduction stages and comprising: a first reduction stage having a screw and a having an axis first wheel; and a second stage including a pinion meshing with a second toothed wheel wherein the first wheel includes two lateral parts spaced axially apart and equipped with teeth adapted to mate with a thread of the screw, and a center part located between the lateral parts, said center part including teeth with an outside diameter less than the diameter of the teeth of the two lateral parts, this center part forming said pinion.

2. Reduction gear in accordance with claim 1, wherein the lateral parts of said first wheel are formed of two half-wheels installed in alignment with a core containing of said center part are made.

3. Reduction gear in accordance with claim 2, wherein the two half-wheels are made of a plastic material.

4. Reduction gear in accordance with claim 2 wherein the two half-wheels include annular sections on their outer faces extending axially outwardly and which are guided in rotation by bores made in each of two symmetrical housing members, these bores acting directly as bearings for the half-wheels.

5. Reduction gear in accordance with claim 2, wherein the center part extends axially over a distance greater than the spacing between the two half-wheels, and the ends of the center part are inserted in recesses equipped with corresponding internal teeth made in each half-wheel that mate with the teeth of the center part.

6. Reduction gear in accordance with claim 2, wherein the two half-wheels are connected axially to the core by swaging the axial ends of the core.

7. Reduction gear in accordance with claim 2, wherein the second wheel includes a hub to which is securely attached a metallic ring, with external teeth, which mates with the teeth made on the center part of said core by extending into a space between the two half-wheels.

8. Reduction gear in accordance with claim 7, wherein the hub is made of a plastic material.

9. Reduction gear in accordance with claim 7, wherein a metallic reinforcing plate is embedded in the hub and includes a bore of the same section as the hub.

* * * * *